United States Patent [19]
Golin et al.

[11] Patent Number: 5,386,232
[45] Date of Patent: Jan. 31, 1995

[54] METHOD AND APPARATUS FOR ENCODING IMAGES USING A SPECIFIED DATA FORMAT

[75] Inventors: Stuart Golin, Hillsboro; Brian Nickerson, Aloha; Michael Keith, Beaverton; Rohan Coelho, Hillsboro, all of Oreg.

[73] Assignee: Intel Corporation, Santa Clara, Calif.

[21] Appl. No.: 78,126

[22] Filed: Jun. 16, 1993

[51] Int. Cl.⁶ .............................. H04N 11/04
[52] U.S. Cl. ..................... 348/391; 348/396; 348/467
[58] Field of Search ............... 348/391, 396, 465, 467, 348/472, 488; H04N 11/04

[56] References Cited

U.S. PATENT DOCUMENTS

| | | | |
|---|---|---|---|
| 4,857,992 | 11/1989 | Richards | 348/391 |
| 5,220,410 | 6/1993 | Wakeland et al. | 348/391 |
| 5,241,382 | 8/1993 | Paik et al. | 348/391 |

Primary Examiner—Victor R. Kostak
Attorney, Agent, or Firm—Steve Mendelsohn; William H. Murray

[57] ABSTRACT

A method and apparatus for encoding image data. After encoding, the image data has an OPERATING SYSTEM header, a BITSTREAM header, a Y-COMPONENT DATA field, a U-COMPONENT DATA field, and a V-COMPONENT DATA field. Each of the DATA fields has a four-byte MC VECTOR COUNT field, an MC VECTORS field, and an ENCODED DATA field that has interleaved binary tree codes and region codes.

54 Claims, 13 Drawing Sheets

FIG. 1 (VIDEO SYSTEM)

204

VERSION NUMBER 302

FLAGS 304

DATA SIZE 306

CB OFFSET 308
RESERVED 310
CHECKSUM 312

IMAGE HEIGHT 314

IMAGE WIDTH 316

Y DATA OFFSET 318

V DATA OFFSET 320

U DATA OFFSET 322

RESERVED 324

ALT QUANT 326

FIG. 6

```
WRITE BITSTREAM HEADER
FOR EACH IMAGE PLANE (Y, U, V)
{
    SEGMENT PLANE INTO A ROUGHLY REGULAR GRID OF CELLS, USING BINARY TREE FOR EACH CELL IN PLANE
    {
        COMPUTE H AND V ENERGY OF CELL (** SEE BELOW)
        IF (H ENERGY AND V ENERGY ARE SMALL)      SELECT MODE 10
        ELSE IF (V ENERGY IS SMALL)               SELECT MODE 3
        ELSE                                      SELECT MODE 0

SELECT QUANTIZATION FOR CELL BASED ON ENERGY FOR EACH CELL IN PLANE
        {
            FOR EACH 4x4 BLOCK
            {
                FOR EACH OF THE 8 DYADS IN THE BLOCK
                {
                    READ 2 PIXELS FROM IMAGE, SUBTRACT PREDICTION TO GET (X,Y)
                    FIND VECTOR IN VQ SET WHICH IS CLOSEST TO (X,Y)
                    ADD (X,Y) TO PREDICTION, CHECK OVERFLOW
                    IF (OVERFLOW CONDITION NOT TRUE)
                        FIND VECTOR IN VQ SET CLOSEST TO (X,Y) AND WHICH DOES NOT CAUSE
                        OVERFLOW
                    STORE DYAD INDEX IN A TEMP ARRAY
                }
                FOR EACH OF THE 4 LINES IN THE BLOCK
                {
                    IF THE PAIR OF DYADS ON THIS LINE FORM A QUAD
                        STORE QUAD INDEX IN TEMP ARRAY
                    ELSE
                        STORE 2 DYAD INDICES IN TEMP ARRAY
                }
                LOOP THRU INDICES GENERATED, AND COMBINE ADJACENT 0 QUADS INTO SPECIAL
                CODES (255, 254, 253)
            }
        }
    }
}

** THE H AND V ENERGY OF A CELL ARE COMPUTED AS FOLLOWS:

SUM = 0
FOR EACH PIXEL IN CELL
{
    DIFF = THIS PIXEL - PIXEL TO THE RIGHT
    H += DIFF*DIFF
    DIFF = THIS PIXEL - PIXEL BELOW IT
    V += DIFF*DIFF
}
H = H / SIZE OF CELL
V = V / SIZE OF CELL

AFTER COMPUTING H AND V, THEY ARE COMPARED WITH ADJUSTABLE THRESHOLDS TO DECIDE WHICH
ENCODING MODE TO USE FOR A CELL.
```

FIG. 7A

```
FOR EACH IMAGE PLANE (Y, U, V)
{
    FIND START OF PLANE DATA USING DATAOFFSET FIELD IN HEADER
    CALCULATE PLANE SIZE FROM XSIZE, YSIZE IN HEADER AND PLANE NUMBER:
        IF (PLANE == Y)
            SIZE = SIZE FROM HEADER
        ELSE
            SIZE = (((SIZE FROM HEADER + 3) >> 2) + 3) & ~ 3

INITIALIZE CELL TO WHOLE IMAGE
    WHILE (BINARY TREE NOT EXHAUSTED)
    {
        GET NEXT BINARY TREE 2-BIT CODE
        IF (IN PRIMARY TREE)
        {
            IF (CODE == V_SPLIT)
                SPLIT CELL IN HALF WITH VERTICAL LINE, PUSH BOTH SUBCELLS ON STACK
            ELSE IF (CODE == H_SPLIT)
                SPLIT CELL IN HALF WITH HORIZONTAL LINE, PUSH BOTH SUBCELLS ON STACK
            ELSE IF (CODE == REL_FILL)
                GET MOTION VECTOR INDEX FROM BITSTREAM
                ENTER SECONDARY TREE
            ELSE IF (CODE == ABS_FILL)
                MARK THIS REGION AS INTRA, ENTER SECONDARY TREE
        }
        ELSE (MUST BE IN SECONDARY TREE)
        {
            IF (CODE == V_SPLIT)
                SPLIT CELL IN HALF WITH VERTICAL LINE, PUSH BOTH SUBCELLS ON STACK
            ELSE IF (CODE == H_SPLIT)
                SPLIT CELL IN HALF WITH HORIZONTAL LINE, PUSH BOTH SUBCELLS ON STACK
            ELSE IF (CODE == VQ_DATA)
                POP CELL FROM STACK
                READ VQ DESCRIPTOR BYTE
                CALL PROCESSCELL
            ELSE IF (CODE == VQ_NULL)
                POP CELL FROM STACK
                READ 2-BIT NULL CODE (EITHER COPY OR SKIP)
                CALL COPYCELL OR SKIPCELL
        }
    }
}
```

FIG. 7B

COPYCELL ROUTINE:

FOR EACH PIXEL IN THE CELL
    COPY PIXEL FROM THE MOTION-COMPENSATED PREVIOUS CELL (IF INTER FRAME) OR FROM PREVIOUS LINE OF
    THIS FRAME (IF INTRA FRAME)

SKIPCELL ROUTINE:

MARK ALL BLOCKS IN CELL AS "SKIPPED"
RETURN

NOTE: THE PURPOSE OF MARKING BLOCKS AS SKIPPED IS SO THAT COLOR CONVERSION AND COPY TO DISPLAY
CAN BE AVOIDED FOR THESE BLOCKS, THUS PROVIDING INCREASED EFFICIENCY.

FIG. 7C

PROCESSCELL ROUTINE

PROCESSCELL IS ACTUALLY A COLLECTION OF ROUTINES, EACH OF WHICH HANDLES ONE OR MORE "MODES" WITH WHICH CELLS CAN BE ENCODED.

THE ROUTINES AVAILABLE ARE:

| | |
|---|---|
| MODE012 | (PROCESSES MODE 0, 1, OR 2) |
| MODE34 | (PROCESSES MODE 3 OR 4) |
| MODE56 | (PROCESSES MODE 5 OR 6) |
| MODE789 | (PROCESSES MODE 7, 8, OR 9) |
| MODE10 | (PROCESSES MODE 10) |
| MODE1112 | (PROCESSES MODE 11 OR 12) |

-------------------------------

MODE 012

IN THIS MODE THE 8 DYADS IN EACH 4X4 BLOCK ARE ENCODED, IN THE ORDER

```
    1   0
    3   2
    5   4
    7   6
```

AND THERE ARE ADDITIONAL CODES THAT CAN REPRESENT MORE THAN ONE DYAD IN A SINGLE CODE.

THE ONLY DIFFERENCE BETWEEN MODES 0, 1, 2 ARE THE APPLICATION OF THE TWO VQ TABLES SPECIFIED FOR THIS CELL. (THESE ARE SPECIFIED IN THE VQ TABLE DESCRIPTOR READ AT THE BEGINNING OF THE CELL.) MODE 0 USES PPPP, MODE 1 USES SPSP, AND MODE 2 USES SPSS, FOR THE 4 LINES OF EACH BLOCK.

```
FOR EACH 4X4 BLOCK IN THE CELL (IN RASTER ORDER)
{
    GET NEXT BYTE FROM BITSTREAM
    IF (BYTE REPRESENTS A DYAD)
        GET PREDICTION PIXEL PAIR, EITHER FROM PREVIOUS LINE OF THIS IMAGE (IF INTRA CODED), OR FROM
        CORRESPONDING LINE OF MOTION-COMPENSATED CELL IN PREVIOUS IMAGE
        ADD DYAD CORRECTION TO PREDICTION
        WRITE NEW PIXELS TO THIS IMAGE
        REPEAT THE ABOVE FOR 2ND DYAD ON THIS LINE

ELSE IF (BYTE REPRESENTS A QUAD)
        GET 4 PIXELS FROM PREDICTIOIN, ADD 4-BYTE QUAD CORRECTOR, WRITE RESULT

ELSE IF (BYTE -- 248)
        READ ANOTHER BYTE, EXTRACT LOWER 7 BITS
        IF (MSB OF BYTE -- 0)
            WRITE THE 7-BIT VALUE TO ALL 16 PIXELS IN THIS BLOCK
        ELSE
            WRITE IT TO ALL OF THIS BLOCK AND ALL OF THE NEXT BLOCK

ELSE IF (BYTE -- 250)
        SKIP THIS BLOCK (MARK IT AS SKIPPED, DO NOTHING MORE)

ELSE IF (BYTE -- 249)
        SKIP THIS BLOCK AND THE NEXT ONE
```

FIG. 7D

MODE012 (CONT)

ELSE IF (BYTE == 255)
        APPLY 0 CORRECTOR TO ALL LINES OF THIS BLOCK UP TO THE 2ND LINE

ELSE IF (BYTE == 254)
        APPLY 0 CORRECTOR TO ALL LINES OF THIS BLOCK UP TO THE 3RD LINE

ELSE IF (BYTE == 253)
        APPLY 0 CORRECTOR TO ALL REMAINING LINES OF THE BLOCK

ELSE IF (BYTE == 252)
        APPLY BYTE 253 PROCESS, THEN APPLY 0 CORRECTOR TO WHOLE NEXT BOCK

ELSE IF (BYTE == 251)
        APPLY BYTE 253 PROCESS, THEN APPLY 0 CORRECTOR TO NEXT 2 BLOCKS
}

MODE 34

MODES 3 AND 4 DIFFER ONLY IN THE APPLICATION OF THE VQ TABLES. MODE 3 USES P ONLY, WHEREAS MODE 4 SWITCHES BETWEEN P AND S ON ALTERNATE LINES.

THE MODE34 PROCESS IS:

DIVIDE Y SIZE OF CELL BY 2
PERFORM MODE012 PROCESS USING BITSTREAM DATA
DOUBLE THE Y SIZE OF THE RESULTING PIXEL ARRAY, BY INSERTING (A+B)>>1 BETWEEN EACH VERTICAL PAIR OF PIXELS.

(NOTE: IF THE CELL IS AT THE TOP OF THE IMAGE, DON'T AVERAGE THE TOP LINE, JUST REPLICATE.)

FIG. 7E

MODE 56

MODES 5 AND 6 DIFFER ONLY IN THE APPLICATION OF THE VQ TABLES. MODE 5 USES P ONLY, WHEREAS MODE 6 SWITCHES BETWEEN P AND S ON ALTERNATE LINES.

THE MODE56 PROCESS IS:

```
FOR EACH 4X4 BLOCK IN THE CELL (IN RASTER ORDER)
{
    FOR EACH OF THE 2ND AND 4TH LINES OF THE BLOCK
    {
    GET NEXT BYTE FROM BITSTREAM
    IF (BYTE REPRESENTS A DYAD)
        GET PREDICTION PIXEL PAIR, EITHER FROM PREVIOUS LINE OF THIS IMAGE (IF INTRA CODED), OR FROM
        CORRESPONDING LINE OF MOTION-COMPENSATED CELL IN PREVIOUS IMAGE
        ADD DYAD CORRECTION TO PREDICTION
        WRITE NEW PIXELS TO THIS IMAGE
        REPEAT THE ABOVE FOR 2ND DYAD ON THIS LINE
        PREVIOUS LINE = AVERAGE OF THIS LINE AND (THIS-2)TH LINE
        READ A BIT FROM BITSTREAM
        IF (BIT == 1)
            ADD ANOTHER CORRECTOR (2 DYADS OR 1 QUAD) TO PREVIOUS LINE

ELSE IF (BYTE REPRESENTS A QUAD)
        GET 4 PIXELS FROM PREDICTION, ADD 4-BYTE QUAD CORRECTOR, WRITE RESULT
        PREVIOUS LINE = AVERAGE OF THIS LINE AND (THIS-2)TH LINE
        READ A BIT FROM BITSTREAM
        IF (BIT == 1)
            ADD ANOTHER CORRECTOR (2 DYADS OR 1 QUAD) TO PREVIOUS LINE

ELSE IF (BYTE == 248)
        READ ANOTHER BYTE, EXTRACT LOWER 7 BITS
        IF (MSB OF BYTE == 0)
            WRITE THE 7-BIT VALUE TO ALL 16 PIXELS IN THIS BLOCK
        ELSE
            WRITE IT TO ALL OF THIS BLOCK AND ALL OF THE NEXT BLOCK

ELSE IF (BYTE == 250)
        SKIP THIS BLOCK (MARK IT AS SKIPPED, DO NOTHING MORE)

ELSE IF (BYTE == 249)
        SKIP THIS BLOCK AND THE NEXT ONE

ELSE IF (BYTE == 253)
        APPLY 0 CORRECTOR TO ALL REMAINING LINES OF THE BLOCK

ELSE IF (BYTE == 252
        APPLY BYTE 253 PROCESS, THEN APPLY 0 CORRECTOR TO WHOLE NEXT BLOCK

ELSE IF (BYTE == 251)
        APPLY BYTE 253 PROCESS, THEN APPLY 0 CORRECTOR TO NEXT 2 BLOCK
    }
}
```

FIG. 7F

MODE 789

THE ONLY DIFFERENCE BETWEEN MODES 7, 8, 9 ARE THE APPLICATION OF THE TWO VQ TABLES SPECIFIED FOR THIS CELL. (THESE ARE SPECIFIED IN THE VQ TABLE DESCRIPTOR READ AT THE BEGINNING OF THE CELL.) MODE 7 USES PPPP, MODE 8 USES SPSP, AND MODE 9 USES SPSS, FOR THE 4 LINES OF EACH BLOCK.

THE PROCESSING FOR THESE MODES IS AS FOLLOWS:

```
FOR EACH 4X4 BLOCK IN THE CELL
{
    FOR EACH 4X1 LINES IN THE CELL
    {
        READ 2 BITS FROM BITSTREAM

IF (BITS -- 00)
            APPLY 0 QUAD TO THIS LINE

ELSE IF (BITS -- 01)
            READ DYAD INDEX FROM BITSTREAM, APPLY TO FIRST DYAD ON LINE
            APPLY 0 DYAD TO 2ND DYAD ON LINE

ELSE IF (BITS -- 10)
            READ CODE FROM BITSTREAM
            IF (CODE IS A DYAD)
                APPLY 0 DYAD TO FIRST DYAD ON LINE,
                APPLY THIS DYAD TO 2ND DYAD ON LINE
            ELSE IF A QUAD
                APPLY QUAD TO THIS LINE

ELSE IF (BITS -- 11)
            READ 2 DYADS FROM BITSTREAM, APPLY TO THIS LINE
    }
}
```

FIG. 7G

MODE 10

MODE 10 PROCESSING IS AS FOLLOWS:

FOR EACH 4X4 BLOCK IN THE CELL
{
    GET BYTE FROM BITSTREAM
    IF BYTE REPRESENTS A QUAD
        GET 4-BYTE CORRECTOR (ABCD) FROM VQ TABLE
    ELSE
        GET ANOTHER BYTE FROM BITSTREAM
        CONCATENATE TWO DYADS TO FORM A 4-BYTE CORRECTOR (ABCD)

IF (INTRA)
        APPLY THIS PATTERN OF CORRECTORS:
                      O O O O
                      B B A A
                      O O O O
                      D D C C
        ELSE (IF INTER) APPLY:
                      B B A A
                      B B A A
                      D D C C
                      D D C C
}

MODES 11, 12

MODES 11 AND 12 DIFFER ONLY IN THE APPLICATION OF THE VQ TABLES. MODE 11 USES P ONLY, WHEREAS MODE 11 SWITCHES BETWEEN P AND S ON ALTERNATE LINES.

THESE MODES CAN ONLY BE USED IN AN INTER-CODED CELL.

PROCESSING FOR MODE 11/12 IS AS FOLLOWS:

DIVIDE Y SIZE OF CELL BY 2
PERFORM MODE012 PROCESS USING BITSTREAM DATA, BUT JUST STORE CORRECTOR ARRAY RATHER THAN ADDING TO PREDICTION
DOUBLE THE Y SIZE OF THE CORRECTOR ARRAY BY REPEATING EACH VALUE VERTICALLY
ADD DOUBLED CORRECTOR ARRAY TO PREDICTED CELL, WRITE RESULT TO IMAGE

5,386,232

METHOD AND APPARATUS FOR ENCODING IMAGES USING A SPECIFIED DATA FORMAT

BACKGROUND OF THE INVENTION

1. Field of the Invention

The present invention relates to methods and apparatuses for processing digital image signals, and, in particular, to encoders for encoding digital image data.

2. Description of the Related Art

Conventional systems for playing video in a PC environment are limited, in part, by the processing capabilities of the PC processors. These limitations include low video frame rates and small video window sizes for display of video images. Such limitations result in low video quality. As a result, some conventional systems for playing video in a PC environment require additional hardware that is designed to process video data at the rates needed to provide acceptable video quality.

It is, therefore, desirable to provide a playback video system for displaying high-quality, full-motion digital video images on a graphics display monitor in a personal computer (PC) environment that does not require any additional hardware. Such a playback video system is preferably capable of performing decoding and display functions to support playback mode. In playback mode, the playback video system accesses encoded video data from a mass storage device, decodes the data, and displays the decoded data on a display monitor.

It is also desirable to provide a compression video system for generating the encoded video data that will be decoded and displayed by the playback video system. Such a compression video system is preferably capable of performing capture, encoding, decoding, and display functions to support both a compression mode and the playback mode. In compression mode, the compression video system captures and encodes video images generated by a video generator, such as a video camera, VCR, or laser disc player. The encoded video data may then be stored to a mass storage device, such as a hard drive or, ultimately, a CDROM. At the same time, the encoded video data may also be decoded and displayed on a display monitor to monitor the compression-mode processing.

It is accordingly an object of this invention to overcome the disadvantages and drawbacks of the known art and to provide an encoder for a compression video system for generating the encoded video data to be decoded and displayed by the playback video system.

Further objects and advantages of this invention will become apparent from the detailed description of a preferred embodiment which follows.

SUMMARY OF THE INVENTION

The present invention comprises a method and apparatus for encoding image data. Image data is received and used to generate and transmit an OPERATING SYSTEM header, a BITSTREAM header, a Y-COMPONENT DATA field, a U-COMPONENT DATA field, and a V-COMPONENT DATA field. The Y-, U-, and V-COMPONENT DATA fields each have a four-byte MC VECTOR COUNT field, an MC VECTORS field, and an ENCODED DATA field, comprising interleaved binary tree codes and region codes.

BRIEF DESCRIPTION OF THE DRAWINGS

Other objects, features, and advantages of the present invention will become more fully apparent from the following detailed description of a preferred embodiment, the appended claims, and the accompanying drawings in which:

FIG. 6 presents the pseudo-code for a preferred embodiment of the real-time encoder of the video system of FIG. 1; and FIGS. 7a–7g present the pseudo-code for a preferred embodiment of the decoder of the video system of FIG. 1.

DESCRIPTION OF PREFERRED EMBODIMENT(S)

Description of Video System

Figure 1:
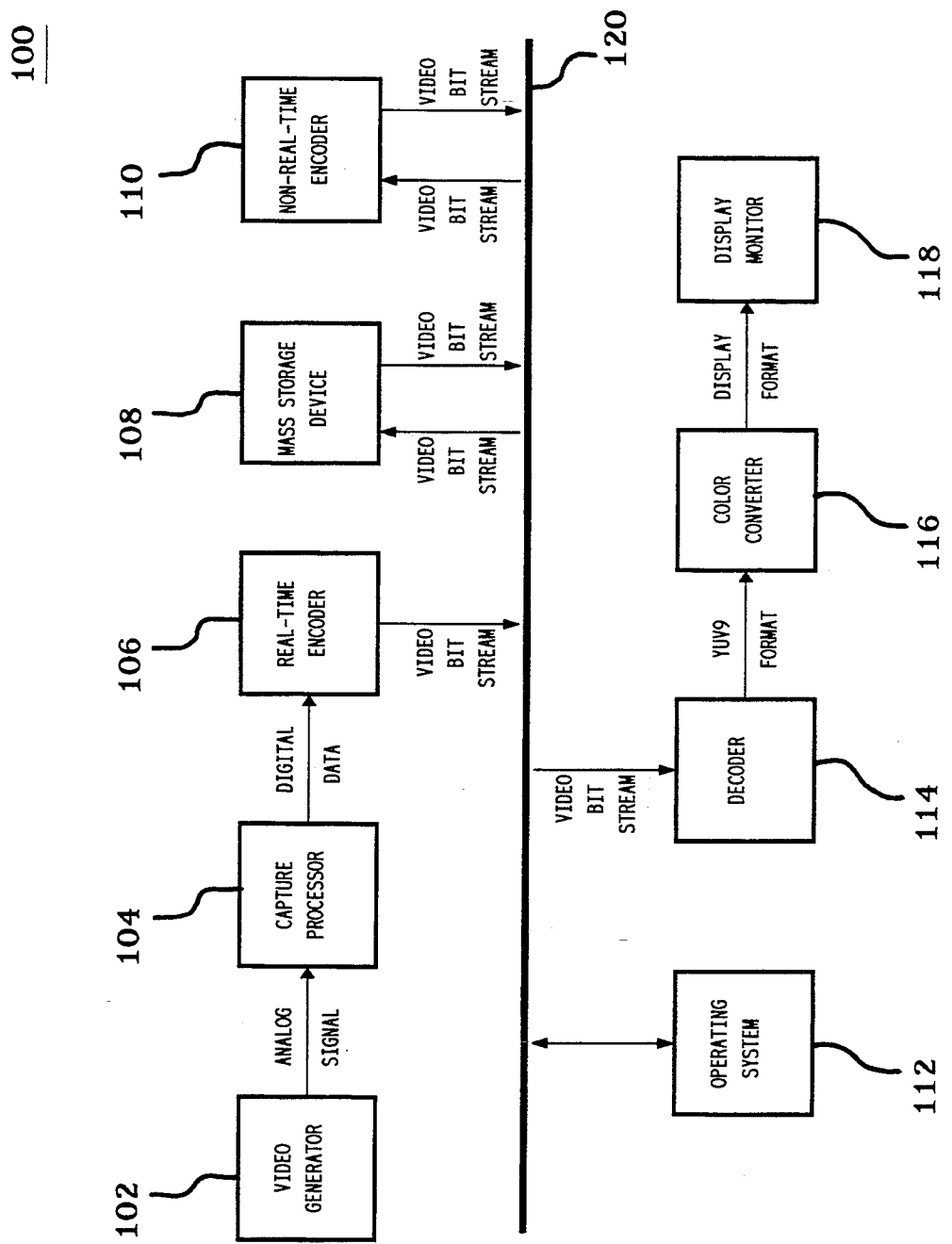
FIG. 1 is a block diagram of a video system for displaying video images in a PC environment, according to a preferred embodiment of the present invention.

Referring now to FIG. 1, there is shown a block diagram of a video system 100 for displaying video images in a PC environment, according to a preferred embodiment of the present invention. Video system led is capable of performing in the compression and playback modes. The operations of video system 100 are controlled by operating system 112 which communicates with the other processing engines of video system 100 via system bus 120.

When video system 100 operates in compression mode, video generator 102 of video system 100 generates analog video signals and transmits those signals to capture processor 104. Capture processor 104 decodes (i.e., separates) the analog video signal into three linear components (one luminance component Y and two chrominance components U and V), digitizes each component, and scales the digitized data. Scaling of the digitized data preferably includes subsampling the U and V data to generate digitized video data in subsampled YUV9 format. Those skilled in the art will understand that YUV9 data has one U-component value and one V-component value for every (4×4) block of Y-component values.

Real-time encoder 106 encodes (i.e., compresses) each component of the captured (i.e., unencoded or uncompressed) YUV9 data separately and transmits the encoded data as a video bitstream via system bus 120 for storage to mass storage device 108. The syntax of the video bitstream is described in further detail later in this specification in conjunction with FIGS. 2–5.

The encoded data may then be optionally further encoded by non-real-time encoder 110. If such further encoding is selected, then non-real-time encoder 110 accesses the encoded video-bitstream data stored in mass storage device 108, encodes the data further, and transmits the further encoded video data back to mass storage device 108. The output of non-real-time encoder 110 is further encoded video data that follows the same video-bitstream syntax as the encoded video data generated by real-time encoder 106.

Video system 100 also provides optional monitoring of the compression-mode processing. If such monitoring is selected, then, in addition to being stored to mass storage device 108, the encoded video bitstream (generated by either real-time encoder 106 or non-real-time encoder 110) is decoded (i.e., decompressed) back to YUV9 format (and scaled for display) by decoder 114. Color converter 116 then converts the decoded, scaled YUV9 data to a display format selected for displaying the video images on display monitor 118. The display format is preferably selected to be either CLUT8 or RGB24 format, depending on the requirements of display monitor 118, although alternative embodiments of the present invention may support additional or alternative display formats.

When video system 100 operates in the playback mode, decoder 114 accesses video data in the encoded video-bitstream format stored in mass storage device 108 and decodes and scales the encoded data back to decoded YUV9 format. Color converter 116 then converts the decoded, scaled YUV9 data to a selected display format for display on display monitor 118.

Those skilled in the art will understand that, depending on the modes to be supported, some of the components of video system 100 as depicted in FIG. 1 may be considered optional. For example, in compression mode, decoder 114, color converter 116, and display monitor lie are optional, if compression-mode monitoring is not selected. Similarly, in playback mode, video generator 102, capture processor 104, real-time encoder 106, and non-real-time encoder 110 are optional.

In a preferred embodiment, operating system 112 is a multi-media operating system, such as, but not limited to, Microsoft ® Video for Windows or Apple ® QuickTime, running on a personal computer with a general-purpose processor, such as, but not limited to, an Intel ® x86 or Motorola ® microprocessor. An Intel ® x86 microprocessor may be an Intel ® 386, 486, or Pentium TM processor. Video generator 102 may be any source of analog video signals, such as a video camera, VCR, or laser disc player. Capture processor 104 and real-time encoder 106 are preferably implemented by a video processor such as an Intel ® i750 encoding engine on an Intel ® Smart Video Board. Non-real-time encoder 110 is preferably implemented in software running on the general-purpose processor.

Mass storage device 108 may be any suitable device for storing digital data, such as a hard drive or a CD-ROM. Those skilled in the art will understand that video system 100 may have more than one mass storage device 108. For example, video system 100 may have a hard drive for receiving encoded video-bitstream data generated during compression mode and a CD-ROM for storing other encoded video-bitstream data for playback mode.

Decoder 114 and color converter 116 are preferably implemented in software running on the general-purpose processor. Display monitor 118 may be any suitable device for displaying video images and is preferably a graphics monitor such as a VGA monitor.

Those skilled in the art will understand that each of the functional processors of video system 100 depicted in FIG. 1 may be implemented by any other suitable hardware/software processing engine.

Overview of Video Encoding Process

Video system 100 encodes each component plane of YUV9 video data separately. Each component plane is segmented into regions using binary-tree image segmentation. Each region is encoded based on adaptive two-phase vector quantization with either intraframe prediction or interframe (i.e., delta) prediction. Each region may also be encoded using motion estimation (preferably at whole-pixel increments). Each region of a component plane may be encoded using different vector-quantization tables and/or different motion-estimation vectors from other regions of that component plane. A region is encoded in units of (4×4) blocks in raster order, with the Y-, U-, and V-component data preferably encoded as 7-bit values.

Every pixel in a region is predicted. If the region is an "intra" region, then pixels are encoded based on the difference D between vertically adjacent pixels in the same frame, such that:

$$D=pixel(n,x,y)-pixel(n,x,y-1),$$

where n is the frame number, x is the column number, and y is the row number. If the region is an "inter" or delta region, then pixels are encoded based on the difference D between corresponding pixels in successive frames taking into account any motion estimation, such that:

$$D=pixel(n,x,y)-pixel(n-1,x+dx,y+dy),$$

where (dx, dy) are the components of the motion estimation vector.

Each region may be encoded using up to two different vector-quantization (VQ) tables: a primary VQ table and a secondary VQ table. A region may be encoded in any one of thirteen different encoding modes, as presented in Table I.

TABLE I

| | Video Encoding Algorithm Modes | | | | | | | | | | | | |
|---|---|---|---|---|---|---|---|---|---|---|---|---|---|
| | MODES | | | | | | | | | | | | |
| Row | 0 | 1 | 2 | 3 | 4 | 5 | 6 | 7 | 8 | 9 | 10A | 10B | 11 | 12 |
| 1 | P | S | S | X | X | Z | Z | $\pi$ | $\sigma$ | $\sigma$ | 0 | PP | P | P |
| 2 | P | P | P | P | P | P | P | $\pi$ | $\pi$ | $\pi$ | PP | PP | P | P |
| 3 | P | S | S | X | X | Z | Z | $\pi$ | $\sigma$ | $\sigma$ | 0 | QQ | Q | S |
| 4 | P | P | S | P | S | P | S | $\pi$ | $\pi$ | $\sigma$ | QQ | PP | Q | S |

The modes of Table I describe how each row of each (4×4) block of a region is encoded. The letter "P" denotes that the primary VQ table is used for the corresponding row. The letter "S" denotes that the secondary VQ table is used. The letter "X" denotes that no corrections are applied and that the pixel values are generated by interpolation. The letter "Z" denotes that interpolation is performed, and, if the next two-bit code has a value of "1" then an "S" correction is performed The letter "$\pi$" denotes that a "P" correction is applied with 2-bit codes to represent 0 dyads and 0 quads. The letter "$\sigma$" denotes that an "S" correction is applied with two-bit codes to represent 0 dyads and 0 quads. For example, in mode 1, the first and third rows of each (4×4) block of the region are encoded using the secondary VQ table, while the second and fourth rows are encoded using the primary VQ table.

Mode 10A applies to "intra" cells and mode 10B applies to "inter" cells. In mode 10A, the zero corrector is applied to the first and third rows, a corrector from the primary VQ table is applied twice horizontally to the second row, and a different corrector from the primary VQ table is applied twice horizontally to the fourth row. In mode 10B, a corrector from the primary VQ table is applied twice horizontally and twice vertically to the first and second rows, and a different corrector from the primary VQ table is applied twice horizontally and twice vertically to the third and fourth rows. In mode 11, a corrector from the primary VQ table is applied twice vertically to the first and second rows, and a different corrector from the primary VQ table is applied twice vertically to the third and fourth rows. In mode 12, a corrector from the primary VQ table is applied twice vertically to the first and second rows, and a different corrector from the secondary VQ table is applied twice vertically to the third and fourth rows.

Pixels in each (4×4) block are encoded in (2×1) dyads in the following order:

```
1 0
3 2
5 4
7 6
```

There are 256 different byte codes for encoding the dyads. 256 byte codes fall into the following six categories:

(1) apply dyad N;
(2) apply two dyads (i.e., a quad);
(3) apply 4, 6, or 8 consecutive zero-valued dyads;
(4) apply zero-valued dyads to n blocks;
(5) skip n blocks; and
(6) apply absolute value to whole block (i.e., "monotone").

The following is the assembler language inner loop for modes 0, 1, or 2 of Table I:

```
mov dl,gs:[ebp+K]           get next data byte
mov eax,es:[edx*4+C]        get VQ delta
add eax,[esi+M*PITCH]       add to prediction
jns quadN                   speedup common case
mov dl,jmpidx[edx]          select action for
jmp jmptableN[edx]          arbitrary case
quadN:
mov [edi+D*PITCH],eax       store 4 pixels
{repeat the above in unrolled loop}
```

The results of encoding each block of each region of each component plane of each frame of video data are organized according the video bitstream syntax, which is described in the next section.

Referring now to FIG. 6, there is presented the pseudo-code for a preferred embodiment of real-time encoder 106 of video system 100 of FIG. 1. The pseudo-code is preferably implemented in assembly language on a general-purpose microprocessor or special-purpose video processor. In order to meet the constraints of real-time encoding, real-time encoder 106 preferably does not use all the features of the bitstream syntax of video system 100. Those skilled in the art will understand that non-real-time encoder 114 preferably uses more features of the bitstream syntax to produce more highly compressed bitstreams, for example, by using motion estimation to determine the optimum predicted cell for inter cells. Real-time encoder 106 preferably uses only intra cells. The "overflow condition" referred to in the pseudo-code of FIG. 6 tests whether both resulting 7-bit pixel values are strictly between the values 8 and 120, when adding a dyad corrector to a prediction.

Referring now to FIGS. 7a–7g, there is presented the pseudo-code for a preferred embodiment of decoder 114 of video system 100 of FIG. 1. The pseudo-code is preferably implemented in assembly language on a general-purpose processor or any processor capable of real-time decoding. All pixels in all three component planes (i.e, Y, V, and U) are preferably 7-bit values with Y constrained to be within 8 and 120.

Description of Video Bitstream Syntax

Figure 2:
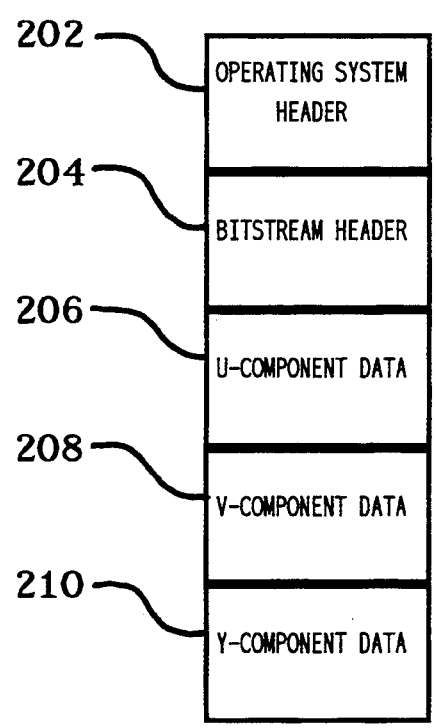
FIG. 2 depicts the syntax of the encoded video bitstream of the video system of FIG. 1.

Referring now to FIG. 2, there is shown a representation of a preferred syntax of the encoded video bitstream 200 corresponding to one frame of video data. Video bitstream 200 is generated by real-time encoder 106 and non-real-time encoder 110, and is decoded by decoder 114 of video system 100 of FIG. 1. Each frame of video data in video bitstream 200 includes OPERATING SYSTEM header 202, VIDEO BITSTREAM header 204, U-COMPONENT DATA field 206, V-COMPONENT DATA field 208, and Y-COMPONENT DATA field 210.

Multi-media operating systems typically support several types of encoding/decoding processes. OPERATING SYSTEM header 202 of the video bitstream 200 informs operating system 112 of video system 100 that the video bitstream 200 is to be decoded using the decoding process implemented by decoder 114 of video system 100 of FIG. 1. In general, OPERATING SYSTEM header 202 contains information required by the particular multi-media operating system of video system 100.

Figure 3:
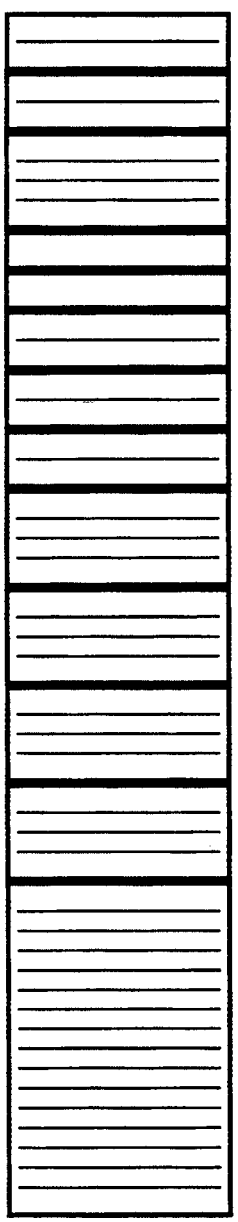
FIG. 3 depicts the syntax of the video bitstream header of the video bitstream of FIG. 2.

Referring now to FIG. 3, there is shown a representation of a preferred syntax of VIDEO BITSTREAM header 204 of video bitstream 200 of FIG. 2. VIDEO BITSTREAM header 204 is a forty-eight-byte field.

VERSION NUMBER 302 of VIDEO BITSTREAM header 204 is a two-byte integer field that identifies the decoding process version number used to create the current data frame. VERSION NUMBER 302 preferably has a decimal value of 32.

Figure 4:
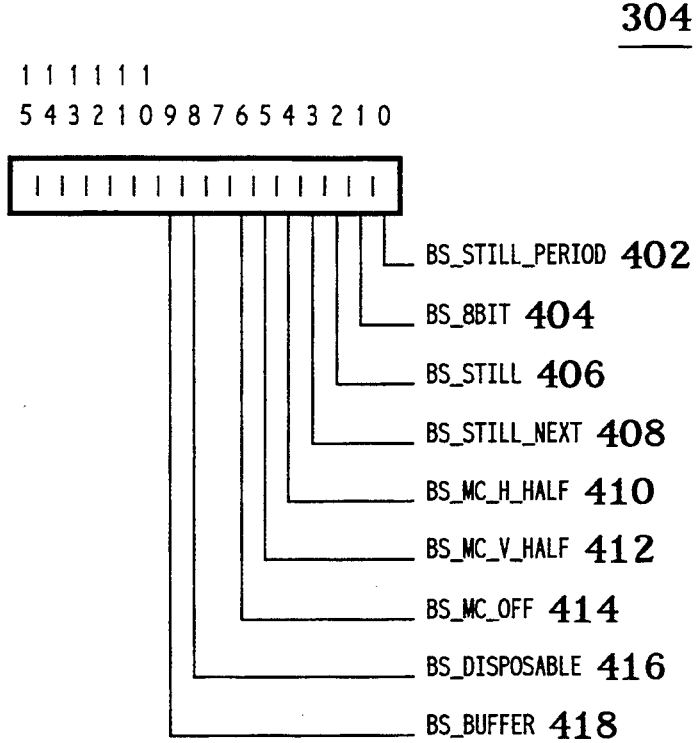
FIG. 4 depicts the syntax of the flags field of the video bitstream header of FIG. 3.

Referring now to FIG. 4, there is shown a representation of a preferred syntax of FLAGS 304 of VIDEO BITSTREAM header 204 of FIG. 3. FLAGS 304 is a two-byte unsigned field.

BSSTILLPERIOD 402 is bit 0 (the least significant bit (LSB)) of FLAGS 304. BSSTILLPERIOD 402 denotes whether the current frame is a periodic still frame (i.e., a periodic key frame). If BSSTILLPERIOD 402 is 1, then the current frame is a periodic still frame.

BS8BIT 404 is bit 1 of FLAGS 304 and denotes whether the YUV-component data uses 8 bits or 7 bits. If BS8BIT 404 is 0, then the YUV-component data uses only 7 bits. In a preferred embodiment, the YUV-component data uses only 7 bits.

BSSTILL 406 is bit 2 of FLAGS 304 and denotes whether the current frame is a still frame (i.e., any type of key frame). If BSSTILL 406 is 1, then the current frame is a still frame.

BSSTILLNEXT 408 is bit 3 of FLAGS 304 and denotes whether the next frame is a still frame. If BSSTILLNEXT 408 is 1, then the next frame is a still frame.

BSMCHHALF 410 is bit 4 of FLAGS 304 and denotes whether the horizontal components of the motion compensation vectors for the current frame are in whole-pixel or half-pixel increments. In a preferred embodiment, the motion compensation vectors are in whole-pixel increments. A value of 0 for BSMCHHALF 410 indicates whole-pixel increments.

BSMCVHALF 412 is bit 5 of FLAGS 304 and denotes whether the vertical components of the motion compensation vectors for the current frame are in whole-pixel or half-pixel increments. In a preferred embodiment, the motion compensation vectors are in whole-pixel increments. A value of 0 for BSMCVHALF 410 indicates whole-pixel increments.

BSMCOFF 414 is bit 6 of FLAGS 304 and denotes whether only the null motion compensation vector is used throughout the current frame. A value of 1 for BSMCOFF 414 indicates that only the null motion compensation vector is used.

Bit 7 of FLAGS 304 is reserved.

BSDISPOSABLE 416 is bit 8 of FLAGS 304 and denotes whether the current frame is disposable. A value of 1 for BSDISPOSABLE 416 indicates that the current frame is disposable.

BSBUFFER 418 is bit 9 of FLAGS 304 and denotes to which of two possible buffers to store the data for the current frame. It also therefore denotes which buffer contains the data for the previous frame (i.e., the other buffer), when the current frame is a delta frame. A value of 0 for BSBUFFER 418 indicates that the current frame is to be stored to buffer 0; a value of 1 indicates buffer 1.

The unassigned bits of FLAGS 304 (i.e., bits 7 and 10-15) are reserved for future use and are set to zero.

Referring again to FIG. 3, DATA SIZE 306 of VIDEO BITSTREAM header 204 is a four-byte integer field that indicates the total number of bits in the encoded image. This value preferably includes the bitstream header information.

CB OFFSET 308 is a one-byte integer field that indicates a byte offset to apply to the addressed vector quantization (VQ) tables. Video system 100 preferably provides a vector set containing more than 16 different vector quantization tables that may be used during encoding. In a preferred embodiment, VQ tables 0 through 15 are designated to real-time encoder 106 and VQ tables 16 through 31 are designated to non-real-time encoder 110. In that preferred embodiment, when real-time encoder 106 generates a video bitstream, CB OFFSET 308 is set to a value of 0. When non-real-time encoder 110 generates a video bitstream, CB OFFSET 308 is set to a value of 16. For decoding of a particular video bitstream, decoder 114 adds CB OFFSET 308 to the VQ table pointers contained in ALT QUANT 326 to address the appropriate VQ tables.

RESERVED 310 is a one-byte reserved field.

CHECKSUM 312 is a two-byte unsigned field that provides a checksum value for the Y, U, and V planes. The value of CHECKSUM 312 is preferably generated by the encoder to be equal to the "exclusive OR" or "XOR" over all pairs of pixels in the three component planes of the decoded image. CHECKSUM 312 is preferably used only during debugging of video system 100.

IMAGE HEIGHT 314 is a two-byte integer field that indicates the number of pixels in each column of the Y-component plane.

IMAGE WIDTH 316 is a two-byte integer field that indicates the number of pixels in each row of the Y-component plane.

Y DATA OFFSET 318 is a four-byte integer field that indicates the offset in number of bytes from the start of the bitstream header to the beginning of the Y-COMPONENT DATA field 210.

V DATA OFFSET 320 is a four-byte integer field that indicates the offset in number of bytes from the start of the bitstream header to the beginning of the V-COMPONENT DATA field 208.

U DATA OFFSET 322 is a four-byte integer field that indicates the offset in number of bytes from the start of the bitstream header to the beginning of the U-COMPONENT DATA field 206.

RESERVED 324 is a four-byte reserved field.

ALT QUANT 326 is a sixteen-byte integer field, each byte of which indicates a pair of VQ tables that may be used in decoding the current frame. The high-order bits of each byte denote the "primary" VQ table, while the low-order bits denote the "secondary" VQ table.

Figure 5:
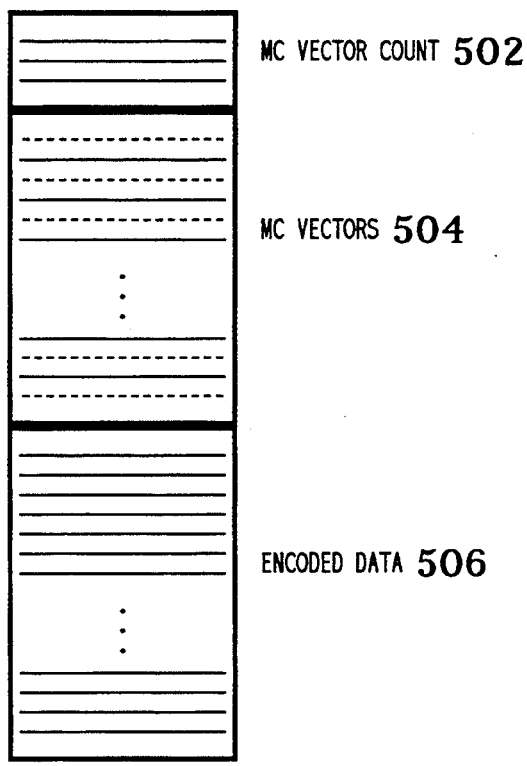
FIG. 5 depicts the syntax of each of the Y-, U-, and V-component data fields of the video bitstream header of FIG. 3.

Referring now to FIG. 5, there is shown a representation of DATA field 500, where DATA field 500 is a preferred syntax of each of U-, V-, and Y-COMPONENT DATA fields 206, 208, and 210 of video bitstream 200 of FIG. 2.

MC VECTOR COUNT 502 of DATA field 500 is four-byte integer field that denotes the number of different motion compensation (MC) vectors that were used to encode (and therefore that are to be used to decode) the current component data plane.

MC VECTORS 504 is a variable-length field that contains the motion compensation vectors used to encode (and to be used to decode) the current component data plane. There are as many entries in MC VECTORS 504 as the value of MC VECTOR COUNT 502. Each entry in MC VECTORS 504 is a two-byte signed MC vector field. The first byte read in the bitstream corresponds to the vertical component and the second byte read in the bitstream corresponds to the horizontal component of a motion compensation vector. When the motion compensation vectors are in whole-pixel increments, component values are the signed byte values. When the motion compensation vectors are in half-pixel increments, component values are the signed byte values divided by two. If the value of MC VECTOR COUNT 502 is zero, then there are no entries in MC VECTORS 504. MC VECTORS 504 may contain up to 256 two-byte MC vector fields.

ENCODED DATA 506 contains unsigned byte data that encodes the current component data plane. ENCODED DATA 506 comprises two-bit binary tree codes and eight-bit region codes. The binary tree codes indicate the segmentation of the current component data plane into regions for encoding. The region codes tell decoder 114 how to decode the encoded pixel data for the current region of a component data plane. ENCODED DATA 506, like MC VECTORS 504, is a variable-length field.

The two-bit binary tree codes are packed four to a byte. These binary-tree-code bytes are then interleaved with the eight-bit region codes. There are three different types of binary tree codes: MC-PHASE tree codes, VQ-PHASE tree codes, and NULL tree codes.

Decoding of an encoded bitstream involves two different phases: a motion-compensation phase and a vector-quantization phase. MC-PHASE tree codes apply during the motion-compensation phase and VQ-PHASE and NULL tree codes apply during the vector-quantization phase. The sequence of tree codes depends on the segmentation and encoding of the component plane.

A value of 0 for an MC-PHASE tree code implies a horizontal split, which means that the current region of the component data field is segmented horizontally into top and bottom halves.

A value of 1 for an MC-PHASE tree code implies a vertical split, which means that the current region of the component data field is segmented vertically into left and right halves.

A value of 2 for an MC-PHASE tree code means that the current region of the component data field is encoded like a key frame.

A value of 3 for an MC-PHASE tree code means that the current region of the component data field is encoded like a delta frame. In this case, motion compensation is performed relative to the previous frame. Such motion compensation is known as "inter-frame" compensation. In this case, the next byte in ENCODED DATA 506 of DATA field 500 of FIG. 1 contains the index for the appropriate motion compensation vector as tabulated in MC VECTORS 504 of DATA field 500 of FIG. 1.

After receiving an MC-PHASE tree code with a value of either 2 or 3, the vector-quantization phase of decoding is entered and the next two-bit binary tree code will be a VQ-PHASE tree code. A value of 0 for a VQ-PHASE tree code implies a horizontal split, which means that the current region of the component data field is segmented horizontally into top and bottom halves.

A value of 1 for a VQ-PHASE tree code implies a vertical split, which means that the current region of the component data field is segmented vertically into left and right halves.

A value of 3 for a VQ-PHASE tree code indicates that the next byte in ENCODED DATA 506 of DATA field 500 of FIG. 1 defines the corrector mode (the upper four bits) and the vector quantization table (the lower four bits) used to decode the current region of the component data field.

A value of 2 for a VQ-PHASE tree code indicates that the next two-bit binary tree code is a NULL tree code.

A value of 0 for a NULL tree code indicates that the corresponding region from the previous frame is to be copied into the current region of the current frame.

A value of 1 for a NULL tree code indicates that the data in the current region is to be left as it is.

The values of 2 and 3 for a NULL tree code are reserved.

Interleaved the binary-tree-code bytes in ENCODED DATA 506 for a region of the current component data plane are the region codes for that region. The region codes consist of a variable number of one-byte codes that describe how the pixels for the current region were encoded (and therefore how they are to be decoded).

The first byte of the set of region codes for a particular region contains, among other information, the region mode (i.e., the mode of Table I used to encode the current region). The rest of the bytes in the set of region codes are the byte codes (i.e., the encoded pixels for the current region).

Those skilled in the art will understand that encoded video data, encoded using the syntax of video bitstream 200, may be further encoded and transmitted as "further encoded" video data that is also encoded in the syntax of video bitstream 200. Non-real-time encoder 110 of video system 100 performs such further encoding on encoded video data generated by real-time encoder 106.

Those skilled in the art will also understand that alternative embodiments of the present invention may be based on multi-media operating systems other than Microsoft ® Video for Windows and Apple ® QuickTime and/or in PC environments based on processors other than Intel ® x86 or Motorola ® microprocessors. It will also be understood by those skilled in the art that the present invention may be used to convert data corresponding to images other than video images.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding image data, comprising the steps of:
  (a) receiving said image data;
  (b) generating an OPERATING SYSTEM header for said image data;
  (c) generating a BITSTREAM header in accordance with said image data;
  (d) generating at least one image component data field in accordance with said image data; and
  (e) transmitting said OPERATING SYSTEM header, said BITSTREAM header, and said at least one image component data field, wherein step (d) comprises the steps of:
    (1) generating a Y-COMPONENT DATA field in accordance with said image data;
    (2) generating a U-COMPONENT DATA field in accordance with said image data; and
    (3) generating a V-COMPONENT DATA field in accordance with said image data, wherein:
    step (d) (1) comprises the steps of:
      (A) generating a Y-component four-byte MC VECTOR COUNT field;
      (B) generating a Y-component MC VECTORS field; and
      (C) generating a Y-component ENCODED DATA field, comprising interleaved binary tree codes and region codings;
    step (d) (2) comprises the steps of:
      (A) generating a U-component four-byte MC VECTOR COUNT field;
      (B) generating a U-component MC VECTORS field; and
      (C) generating a U-component ENCODED DATA field, comprising interleaved binary tree codes and region codes; and
    step (d) (3) comprises the steps of:
      (A) generating a V-component four-byte MC VECTOR COUNT field;
      (B) generating a V-component MC VECTORS field; and (C) generating a V-component ENCODED DATA field, comprising interleaved binary tree codes and region codes.

2. The method of claim 1, wherein step (c) comprises the steps of:
   (1) generating a two-byte unsigned FLAGS field;
   (2) generating a four-byte integer DATA SIZE field;
   (3) generating a one-byte integer CB OFFSET field;
   (4) generating a two-byte integer IMAGE HEIGHT field;
   (5) generating a two-byte integer IMAGE WIDTH field;
   (e) generating a four-byte integer Y DATA OFFSET field;
   (7) generating a four-byte integer U DATA OFFSET field;
   (8) generating a four-byte integer V DATA OFFSET field; and
   (9) generating a sixteen-byte integer ALT QUANT field.

3. The method of claim 2, wherein step (c) (1) comprises the steps of:
   (A) generating a BSSTILLPERIOD bit;
   (B) generating a BSSTILL bit;
   (C) generating a BSSTILLNEXT bit;
   (D) generating a BSMCOFF bit;
   (E) generating a BSDISPOSABLE bit; and
   (F) generating a BSBUFFER bit.

4. The method of claim 2, wherein step (c) (9) comprises the step of generating one or more one-byte pairs of vector-quantization table numbers, wherein the high-order bits of each byte correspond to a primary vector-quantization table and the low-order bits of each byte correspond to a secondary vector-quantization table.

5. The method of claim 1, wherein step (a) comprises the step of receiving said image data in an unencoded format.

6. The method of claim 5, wherein step (a) comprises the step of receiving said image data in YUV9 format.

7. The method of claim 1, wherein step (a) comprises the step of receiving said image data in an encoded format.

8. The method of claim 7, wherein step (a) comprises the step of receiving said image data comprising a received input OPERATING SYSTEM header, a received BITSTREAM header, a received Y-COMPONENT DATA field, a received U-COMPONENT DATA field, and a received V-COMPONENT DATA field.

9. A method for encoding image data, comprising the steps of:
   (a) receiving said image data;
   (b) generating an OPERATING SYSTEM header for said image data;
   (c) generating a BITSTREAM header in accordance with said image data, wherein step (c) comprises the steps of:
   (1) generating a two-byte unsigned FLAGS field, wherein step (c) (1) comprises the steps of:
      (A) generating a BSSTILLPERIOD bit;
      (B) generating a BSSTILL bit;
      (C) generating a BSSTILLNEXT bit;
      (D) generating a BSMCOFF bit;
      (E) generating a BSDISPOSABLE bit; and
      (F) generating a BSBUFFER bit;
   (2) generating a four-byte integer DATA SIZE field;
   (3) generating a one-byte integer CB OFFSET field;
   (4) generating a two-byte integer IMAGE HEIGHT field;
   (5) generating a two-byte integer IMAGE WIDTH field;
   (6) generating a four-byte integer Y DATA OFFSET field;
   (7) generating a four-byte integer U DATA OFFSET field;
   (8) generating a four-byte integer V DATA OFFSET field; and
   (9) generating a sixteen-byte integer ALT QUANT field, wherein step (c) (9) comprises the step of generating one or more one-byte pairs of vector-quantization table numbers, wherein the high-order bits of each byte correspond to a primary vector-quantization table and the low-order bits of each byte correspond to a secondary vector-quantization table;
   (d) generating a Y-COMPONENT DATA field in accordance with said image data, wherein step (d) comprises the steps of:
   (1) generating a Y-component four-byte MC VECTOR COUNT field;
   (2) generating a Y-component MC VECTORS field; and
   (3) generating a Y-component ENCODED DATA field, comprising interleaved binary tree codes and region codes;
   (e) generating a U-COMPONENT DATA field in accordance with said image data, wherein step (e) comprises the steps of:
   (1) generating a U-component four-byte MC VECTOR COUNT field;
   (2) generating a U-component MC VECTORS field; and
   (3) generating a U-component ENCODED DATA field, comprising interleaved binary tree codes and region codes;
   (f) generating a V-COMPONENT DATA field in accordance with said image data, wherein step (f) comprises the steps of:
   (1) generating a V-component four-byte MC VECTOR COUNT field;
   (2) generating a V-component MC VECTORS field; and
   (3) generating a V-component ENCODED DATA field, comprising interleaved binary tree codes and region codes; and
   (g) transmitting said OPERATING SYSTEM header, said BITSTREAM header, said Y-COMPONENT DATA field, said U-COMPONENT DATA field, and said V-COMPONENT DATA field.

10. The method of claim 9, wherein step (a) comprises the step of receiving said image data in unencoded YUV9 format.

11. The method of claim 9, wherein step (a) comprises the step of receiving said image data comprising a received input OPERATING SYSTEM header, a received BITSTREAM header, a received Y-COMPONENT DATA field, a received U-COMPONENT DATA field, and a received V-COMPONENT DATA field.

12. An apparatus for encoding image data, comprising:
(a) means for receiving said image data;
(b) means for generating an OPERATING SYSTEM header for said image data;
(c) means for generating a BITSTREAM header in accordance with said image data;
(d) means for generating at least one image component data field in accordance with said image data; and
(e) means for transmitting said OPERATING SYSTEM header, said BITSTREAM header, and said at least one image component data field, wherein means (d) comprises:
  (1) means for generating a Y-COMPONENT DATA field in accordance with said image data;
  (2) means for generating a U-COMPONENT DATA field in accordance with said image data; and
  (3) means for generating a V-COMPONENT DATA field in accordance with said image data, wherein:
  means (d) (1) comprises:
    (A) means for generating a Y-component four-byte MC VECTOR COUNT field;
    (B) means for generating a Y-component MC VECTORS field; and
    (C) means for generating a Y-component ENCODED DATA field, comprising interleaved binary tree codes and region codes;
  means (d) (2) comprises:
    (A) means for generating a U-component four-byte MC VECTOR COUNT field;
    (B) means for generating a U-component MC VECTORS field; and
    (C) means for generating a U-component ENCODED DATA field, comprising interleaved binary tree codes and region codes; and
  means (d) (3) comprises:
    (A) means for generating a V-component four-byte MC VECTOR COUNT field;
    (B) means for generating a V-component MC VECTORS field; and
    (C) means for generating a V-component ENCODED DATA field, comprising interleaved binary tree codes and region codes.

13. The apparatus of claim 12, wherein means (c) comprises:
(1) means for generating a two-byte unsigned FLAGS field;
(2) means for generating a four-byte integer DATA SIZE field;
(3) means for generating a one-byte integer CB OFFSET field;
(4) means for generating a two-byte integer IMAGE HEIGHT field;
(5) means for generating a two-byte integer IMAGE WIDTH field;
(6) means for generating a four-byte integer Y DATA OFFSET field;
(7) means for generating a four-byte integer U DATA OFFSET field;
(8) means for generating a four-byte integer V DATA OFFSET field; and
(9) means for generating a sixteen-byte integer ALT QUANT field.

14. The apparatus of claim 13, wherein means (c) (1) comprises:
(A) means for generating a BSSTILLPERIOD bit;
(B) means for generating a BSSTILL bit;
(C) means for generating a BSSTILLNEXT bit;
(D) means for generating a BSMCOFF bit;
(E) means for generating a BSDISPOSABLE bit; and
(F) means for generating a BSBUFFER bit.

15. The apparatus of claim 13, wherein means (c) (9) comprises means for generating one or more one-byte pairs of vector-quantization table numbers, wherein the high-order bits of each byte correspond to a primary vector-quantization table and the low-order bits of each byte correspond to a secondary vector-quantization table.

16. The apparatus of claim 12, wherein means (a) comprises means for receiving said image data in an unencoded format.

17. The apparatus of claim 16, wherein means (a) comprises means for receiving said image data in YUV9 format.

18. The apparatus of claim 12, wherein means (a) comprises means for receiving said image data in an encoded format.

19. The apparatus of claim 18, wherein means (a) comprises means for receiving said image data comprising a received input OPERATING SYSTEM header, a received BITSTREAM header, a received Y-COMPONENT DATA field, a received U-COMPONENT DATA field, and a received V-COMPONENT DATA field.

20. An apparatus for encoding image data, comprising:
(a) means for receiving said image data;
(b) means for generating an OPERATING SYSTEM header for said image data;
(c) means for generating a BITSTREAM header in accordance with said image data, wherein means (c) comprises:
  (1) means for generating a two-byte unsigned FLAGS field, wherein means (c) (1) comprises:
    (A) means for generating a BSSTILLPERIOD bit;
    (B) means for generating a BSSTILL bit;
    (C) means for generating a BSSTILLNEXT bit;
    (D) means for generating a BSMCOFF bit;
    (E) means for generating a BSDISPOSABLE bit; and
    (F) means for generating a BSBUFFER bit;
  (2) means for generating a four-byte integer DATA SIZE field;
  (3) means for generating a one-byte integer CB OFFSET field;
  (4) means for generating a two-byte integer IMAGE HEIGHT field;
  (5) means for generating a two-byte integer IMAGE WIDTH field;
  (6) means for generating a four-byte integer Y DATA OFFSET field;
  (7) means for generating a four-byte integer U DATA OFFSET field;
  (8) means for generating a four-byte integer V DATA OFFSET field; and
  (9) means for generating a sixteen-byte integer ALT QUANT field, wherein means (c)(9) comprises means for generating one or more one-byte pairs of vector-quantization table numbers, wherein the high-order bits of each byte correspond to a primary vector-quantization table and the low-order bits of each byte correspond to a secondary vector-quantization table;

(d) means for generating a Y-COMPONENT DATA field in accordance with said image data, wherein means (d) comprises:
  (1) means for generating a Y-component four-byte MC VECTOR COUNT field;
  (2) means for generating a Y-component MC VECTORS field; and
  (3) means for generating a Y-component ENCODED DATA field, comprising interleaved binary tree codes and region codes;

(e) means for generating a U-COMPONENT DATA field in accordance with said image data, wherein means (e) comprises:
  (1) means for generating a U-component four-byte MC VECTOR COUNT field;
  (2) means for generating a U-component MC VECTORS field; and
  (3) means for generating a U-component ENCODED DATA field, comprising interleaved binary tree codes and region codes;

(f) means for generating a V-COMPONENT DATA field in accordance with said image data, wherein means (f) comprises:
  (1) means for generating a V-component four-byte MC VECTOR COUNT field;
  (2) means for generating a V-component MC VECTORS field; and
  (3) means for generating a V-component ENCODED DATA field, comprising interleaved binary tree codes and region codes; and (g) means for transmitting said OPERATING SYSTEM header, said BITSTREAM header, said Y-COMPONENT DATA field, said U-COMPONENT DATA field, and said V-COMPONENT DATA field.

21. The apparatus of claim 20, wherein means (a) comprises means for receiving said image data in unencoded YUV9 format.

22. The apparatus of claim 20, wherein means (a) comprises means for receiving said image data comprising a received input OPERATING SYSTEM header, a received BITSTREAM header, a received Y-COMPONENT DATA field, a received U-COMPONENT DATA field, and a received V-COMPONENT DATA field.

23. A method for encoding image data, comprising the steps of:
  (a) receiving said image data;
  (b) generating an OPERATING SYSTEM header for said image data;
  (c) generating a BITSTREAM header in accordance with said image data;
  (d) generating at least one image component data field in accordance with said image data; and
  (e) transmitting said OPERATING SYSTEM header, said BITSTREAM header, and said at least one image component data field, wherein step (c) comprises the steps of:
    (1) generating a two-byte unsigned FLAGS field;
    (2) generating a four-byte integer DATA SIZE field;
    (3) generating a one-byte integer CB OFFSET field;
    (4) generating a two-byte integer IMAGE HEIGHT field;
    (5) generating a two-byte integer IMAGE WIDTH field;
    (6) generating a four-byte integer Y DATA OFFSET field;
    (7) generating a four-byte integer U DATA OFFSET field;
    (8) generating a four-byte integer V DATA OFFSET field; and
    (9) generating a sixteen-byte integer ALT QUANT field.

24. The method of claim 23, wherein step (d) comprises the steps of:
  (1) generating a Y-COMPONENT DATA field in accordance with said image data;
  (2) generating a U-COMPONENT DATA field in accordance with said image data; and
  (3) generating a V-COMPONENT DATA field in accordance with said image data.

25. The method of claim 24, wherein step (d) (1) comprises the steps of:
  (A) generating a Y-component four-byte MC VECTOR COUNT field;
  (B) generating a Y-component MC VECTORS field; and
  (C) generating a Y-component ENCODED DATA field, comprising interleaved binary tree codes and region codes;

step (d) (2) comprises the steps of:
  (A) generating a U-component four-byte MC VECTOR COUNT field;
  (B) generating a U-component MC VECTORS field; and
  (C) generating a U-component ENCODED DATA field, comprising interleaved binary tree codes and region codes; and step (d) (3) comprises the steps of:
  (A) generating a V-component four-byte MC VECTOR COUNT field;
  (B) generating a V-component MC VECTORS field; and
  (C) generating a V-component ENCODED DATA field, comprising interleaved binary tree codes and region codes.

26. The method of claim 23, wherein step (c) (1) comprises the steps of:
  (A) generating a BSSTILLPERIOD bit;
  (B) generating a BSSTILL bit;
  (C) generating a BSSTILLNEXT bit;
  (D) generating a BSMCOFF bit;
  (E) generating a BSDISPOSABLE bit; and
  (F) generating a BSBUFFER bit.

27. The method of claim 27, wherein step (c) (9) comprises the step of generating one or more one-byte pairs of vector-quantization table numbers, wherein the high-order bits of each byte correspond to a primary vector-quantization table and the low-order bits of each byte correspond to a secondary vector-quantization table.

28. The method of claim 23, wherein step (a) comprises the step of receiving said image data in an unencoded format.

29. The method of claim 28, wherein step (a) comprises the step of receiving said image data in YUV9 format.

30. The method of claim 23, wherein step (a) comprises the step of receiving said image data in an encoded format.

31. The method of claim 30, wherein step (a) comprises the step of receiving said image data comprising a received input OPERATING SYSTEM header, a received BITSTREAM header, a received Y-COMPONENT DATA field, a received U-COMPONENT DATA field, and a received V-COMPONENT DATA field.

32. A method for encoding image data, comprising the steps of:
   (a) receiving said image data;
   (b) generating an OPERATING SYSTEM header for said image data;
   (c) generating a BITSTREAM header in accordance with said image data;
   (d) generating at least one image component data field in accordance with said image data; and
   (e) transmitting said OPERATING SYSTEM header, said BITSTREAM header, and said at least one image component data field, wherein step (a) comprises the step of receiving said image data in an unencoded format.

33. The method of claim 32, wherein step (d) comprises the steps of:
   (1) generating a Y-COMPONENT DATA field in accordance with said image data;
   (2) generating a U-COMPONENT DATA field in accordance with said image data; and
   (3) generating a V-COMPONENT DATA field in accordance with said image data.

34. The method of claim 33, wherein step (d) (1) comprises the steps of:
   (A) generating a Y-component four-byte MC VECTOR COUNT field;
   (B) generating a Y-component MC VECTORS field; and
   (C) generating a Y-component ENCODED DATA field, comprising interleaved binary tree codes and region codes;
   step (d) (2) comprises the steps of:
   (A) generating a U-component four-byte MC VECTOR COUNT field;
   (B) generating a U-component MC VECTORS field; and
   (C) generating a U-component ENCODED DATA field, comprising interleaved binary tree codes and region codes; and
   step (d) (3) comprises the steps of:
   (A) generating a V-component four-byte MC VECTOR COUNT field;
   (B) generating a V-component MC VECTORS field; and
   (C) generating a V-component ENCODED DATA field, comprising interleaved binary tree codes and region codes.

35. The method of claim 32, wherein step (c) comprises the steps of:
   (1) generating a two-byte unsigned FLAGS field;
   (2) generating a four-byte integer DATA SIZE field;
   (3) generating a one-byte integer CB OFFSET field;
   (4) generating a two-byte integer IMAGE HEIGHT field;
   (5) generating a two-byte integer IMAGE WIDTH field;
   (6) generating a four-byte integer Y DATA OFFSET field;
   (7) generating a four-byte integer U DATA OFFSET field;
   (8) generating a four-byte integer V DATA OFFSET field; and
   (9) generating a sixteen-byte integer ALT QUANT field.

36. The method of claim 35, wherein step (c) (1) comprises the steps of:
   (A) generating a BSSTILLPERIOD bit;
   (B) generating a BSSTILL bit;
   (C) generating a BSSTILLNEXT bit;
   (D) generating a BSMCOFF bit;
   (E) generating a BSDISPOSABLE bit; and
   (F) generating a BSBUFFER bit.

37. The method of claim 35, wherein step (c) (9) comprises the step of generating one or more one-byte pairs of vector-quantization table numbers, wherein the high-order bits of each byte correspond to a primary vector-quantization table and the low-order bits of each byte correspond to a secondary vector-quantization table.

38. The method of claim 32, wherein step (a) comprises the step of receiving said image data in YUV9 format.

39. An apparatus for encoding image data, comprising:
   (a) means for receiving said image data;
   (b) means for generating an OPERATING SYSTEM header for said image data;
   (c) means for generating a BITSTREAM header in accordance with said image data;
   (d) means for generating at least one image component data field in accordance with said image data; and
   (e) means for transmitting said OPERATING SYSTEM header, said BITSTREAM header, and said at least one image component data field, wherein means (c) comprises:
   (1) means for generating a two-byte unsigned FLAGS field;
   (2) means for generating a four-byte integer DATA SIZE field;
   (3) means for generating a one-byte integer CB OFFSET field;
   (4) means for generating a two-byte integer IMAGE HEIGHT field;
   (5) means for generating a two-byte integer IMAGE WIDTH field;
   (6) means for generating a four-byte integer Y DATA OFFSET field;
   (7) means for generating a four-byte integer U DATA OFFSET field;
   (8) means for generating a four-byte integer V DATA OFFSET field; and
   (9) means for generating a sixteen-byte integer ALT QUANT field.

40. The apparatus of claim 39, wherein means (d) comprises:
   (1) means for generating a Y-COMPONENT DATA field in accordance with said image data;
   (2) means for generating a U-COMPONENT DATA field in accordance with said image data; and
   (3) means for generating a V-COMPONENT DATA field in accordance with said image data.

41. The apparatus of claim 40, wherein means (d) (1) comprises:

(A) means for generating a Y-component four-byte MC VECTOR COUNT field;
(B) means for generating a Y-component MC VECTORS field; and
(C) means for generating a Y-component ENCODED DATA field, comprising interleaved binary tree codes and region codes;

means (d) (2) comprises:
(A) means for generating a U-component four-byte MC VECTOR COUNT field;
(B) means for generating a U-component MC VECTORS field; and
(C) means for generating a U-component ENCODED DATA field, comprising interleaved binary tree codes and region codes; and means (d) (3) comprises:
(A) means for generating a V-component four-byte MC VECTOR COUNT field;
(B) means for generating a V-component MC VECTORS field; and
(C) means for generating a V-component ENCODED DATA field, comprising interleaved binary tree codes and region codes.

42. The apparatus of claim 39, wherein means (c) (1) comprises:
(A) means for generating a BSSTILLPERIOD bit;
(B) means for generating a BSSTILL bit;
(C) means for generating a BSSTILLNEXT bit;
(D) means for generating a BSMCOFF bit;
(E) means for generating a BSDISPOSABLE bit; and
(F) means for generating a BSBUFFER bit.

43. The apparatus of claim 49, wherein means (c) (9) comprises means for generating one or more one-byte pairs of vector-quantization table numbers, wherein the high-order bits of each byte correspond to a primary vector-quantization table and the low-order bits of each byte correspond to a secondary vector-quantization table.

44. The apparatus of claim 39, wherein means (a) comprises means for receiving said image data in an unencoded format.

45. The apparatus of claim 44, wherein means (a) comprises means for receiving said image data in YUV9 format.

46. The apparatus of claim 39, wherein means (a) comprises means for receiving said image data in an encoded format.

47. The apparatus of claim 46, wherein means (a) comprises means for receiving said image data comprising a received input OPERATING SYSTEM header, a received BITSTREAM header, a received Y-COMPONENT DATA field, a received U-COMPONENT DATA field, and a received V-COMPONENT DATA field.

48. An apparatus for encoding image data, comprising:
(a) means for receiving said image data;
(b) means for generating an OPERATING SYSTEM header for said image data;
(c) means for generating a BITSTREAM header in accordance with said image data;
(d) means for generating at least one image component data field in accordance with said image data; and
(e) means for transmitting said OPERATING SYSTEM header, said BITSTREAM header, and said at least one image component data field, wherein means (a) comprises means for receiving said image data in an unencoded format.

49. The apparatus of claim 48, wherein means (d) comprises:
(1) means for generating a Y-COMPONENT DATA field in accordance with said image data;
(2) means for generating a U-COMPONENT DATA field in accordance with said image data; and
(3) means for generating a V-COMPONENT DATA field in accordance with said image data.

50. The apparatus of claim 49, wherein means (d) (1) comprises:
(A) means for generating a Y-component four-byte MC VECTOR COUNT field;
(B) means for generating a Y-component MC VECTORS field; and
(C) means for generating a Y-component ENCODED DATA field, comprising interleaved binary tree codes and region codes;

means (d) (2) comprises:
(A) means for generating a U-component four-byte MC VECTOR COUNT field;
(B) means for generating a U-component MC VECTORS field; and
(C) means for generating a U-component ENCODED DATA field, comprising interleaved binary tree codes and region codes; and means (d) (3) comprises:
(A) means for generating a V-component four-byte MC VECTOR COUNT field;
(B) means for generating a V-component MC VECTORS field; and
(C) means for generating a V-component ENCODED DATA field, comprising interleaved binary tree codes and region codes.

51. The apparatus of claim 48, wherein means (c) comprises:
(1) means for generating a two-byte unsigned FLAGS field;
(2) means for generating a four-byte integer DATA SIZE field;
(3) means for generating a one-byte integer CB OFFSET field;
(4) means for generating a two-byte integer IMAGE HEIGHT field;
(5) means for generating a two-byte integer IMAGE WIDTH field;
(6) means for generating a four-byte integer Y DATA OFFSET field;
(7) means for generating a four-byte integer U DATA OFFSET field;
(8) means for generating a four-byte integer V DATA OFFSET field; and
(9) means for generating a sixteen-byte integer ALT QUANT field.

52. The apparatus of claim 51, wherein means (c) (1) comprises:
(A) means for generating a BSSTILLPERIOD bit;
(B) means for generating a BSSTILL bit;
(C) means for generating a BSSTILLNEXT bit;
(D) means for generating a BSMCOFF bit;
(E) means for generating a BSDISPOSABLE bit; and
(F) means for generating a BSBUFFER bit.

53. The apparatus of claim 51, wherein means (c) (9) comprises means for generating one or more one-byte pairs of vector-quantization table numbers, wherein the high-order bits of each byte correspond to a primary vector-quantization table and the low-order bits of each byte correspond to a secondary vector-quantization table.

54. The apparatus of claim 48, wherein means (a) comprises means for receiving said image data in YUV9 format.

* * * * *

UNITED STATES PATENT AND TRADEMARK OFFICE
CERTIFICATE OF CORRECTION

PATENT NO. : 5,386,232  
DATED : January 31, 1995  
INVENTOR(S) : Stuart Golin, Brian Nickerson, Michael Keith, and Rohan Coelho.

Page 1 of 5

It is certified that error appears in the above-indentified patent and that said Letters Patent is hereby corrected as shown below:

Column 10, line 55, delete "codings" and insert therefor --codes--.

Column 11, line 15, delete "(e)" and insert therefor --(6)--.

Column 11, line 25, delete "BSSTILLPERIOD" and insert therefor --BS_STILL_PERIOD--.

Column 11, line 26, delete "BSSTILL" and insert therefor --BS_STILL--.

Column 11, line 27, delete "BSSTILLNEXT" and insert therefor --BS_STILL_NEXT--.

Column 11, line 28, delete "BSMCOFF" and insert therefor --BS_MC_OFF--.

Column 11, line 29, delete "BSDISPOSABLE" and insert therefor --BS_DISPOSABLE--.

Column 11, line 30, delete "BSBUFFER" and insert therefor --BS_BUFFER--.

Column 11, line 63, delete "BSSTILLPERIOD" and insert therefor --BS_STILL_PERIOD--.

Column 11, line 64, delete "BSSTILL" and insert therefor --BS_STILL--.

Column 11, line 65, delete "BSSTILLNEXT" and insert therefor --BS_STILL_NEXT--.

Column 11, line 66, delete "BSMCOFF" and insert therefor --BS_MC_OFF--.

UNITED STATES PATENT AND TRADEMARK OFFICE
CERTIFICATE OF CORRECTION

PATENT NO. : 5,386,232

DATED : January 31, 1995

INVENTOR(S) : Stuart Golin, Brian Nickerson, Michael Keith, and Rohan Coelho.

It is certified that error appears in the above-indentified patent and that said Letters Patent is hereby corrected as shown below:

Column 11, line 67, delete "BSDISPOSABLE" and insert therefor --BS_DISPOSABLE--.

Column 11, line 68, delete "BSBUFFER" and insert therefor --BS_BUFFER--.

Column 14, line 1, delete "BSSTILLPERIOD" and insert therefor --BS_STILL_PERIOD--.

Column 14, line 3, delete "BSSTILL" and insert therefor --BS_STILL--.

Column 14, line 4, delete "BSSTILLNEXT" and insert therefor --BS_STILL_NEXT--.

Column 14, line 5, delete "BSMCOFF" and insert therefor --BS_MC_OFF--.

Column 14, line 6, delete "BSDISPOSABLE" and insert therefor --BS_DISPOSABLE--.

Column 14, line 8, delete "BSBUFFER" and insert therefor --BS_BUFFER--.

Column 14, line 42, delete "BSSTILLPERIOD" and insert therefor --BS_STILL_PERIOD--.

Column 14, line 44, delete "BSSTILL" and insert therefor --BS_STILL--.

Column 14, line 45, delete "BSSTILLNEXT" and insert therefor --BS_STILL_NEXT--.

Column 14, line 46, delete "BSMCOFF" and insert therefor --BS_MC_OFF--.

Column 14, line 47, delete "BSDISPOSABLE" and insert therefor --BS_DISPOSABLE--.

UNITED STATES PATENT AND TRADEMARK OFFICE
CERTIFICATE OF CORRECTION

Page 3 of 5

PATENT NO. : 5,386,232

DATED : January 31, 1995

INVENTOR(S) : Stuart Golin, Brian Nickerson, Michael Keith and Rohan Coelho.

It is certified that error appears in the above-indentified patent and that said Letters Patent is hereby corrected as shown below:

Column 14, line 49, delete "BSBUFFER" and insert therefor --BS_BUFFER--.

Column 16, line 47, delete "BSSTILLPERIOD" and insert therefor --BS_STILL_PERIOD--.

Column 16, line 48, delete "BSSTILL" and insert therefor --BS_STILL--.

Column 16, line 49, delete "BSSTILLNEXT" and insert therefor --BS_STILL_NEXT--.

Column 16, line 50, delete "BSMCOFF" and insert therefor --BS_MC_OFF--.

Column 16, line 51, delete "BSDISPOSABLE" and insert therefor --BS_DISPOSABLE--.

Column 16, line 52, delete "BSBUFFER" and insert therefor --BS_BUFFER--.

Column 16, line 53, delete "27" and insert therefor --23--.

Column 18, line 9, delete "BSSTILLPERIOD" and insert therefor --BS_STILL_PERIOD--.

Column 18, line 10, delete "BSSTILL" and insert therefor --BS_STILL--.

Column 18, line 11, delete "BSSTILLNEXT" and insert therefor --BS_STILL_NEXT--.

Column 18, line 12, delete "BSMCOFF" and insert therefor --BS_MC_OFF--.

Column 18, line 13, delete "BSDISPOSABLE" and insert therefor --BS_DISPOSABLE--.

UNITED STATES PATENT AND TRADEMARK OFFICE
CERTIFICATE OF CORRECTION

PATENT NO. : 5,386,232

DATED : January 31, 1995

INVENTOR(S) : Stuart Golin, Brian Nickerson, Michael Keith and Rohan Coelho.

It is certified that error appears in the above-indentified patent and that said Letters Patent is hereby corrected as shown below:

Column 18, line 14, delete "BSBUFFER" and insert therefor --BS_BUFFER--.

Column 19, lines 26, delete "BSSTILLPERIOD" and insert therefor --BS_STILL_PERIOD--.

Column 19, line 28, delete "BSSTILL" and insert therefor --BS_STILL--.

Column 19, line 29, delete "BSSTILLNEXT" and insert therefor --BS_STILL_NEXT--.

Column 19, line 30, delete "BSMCOFF" and insert therefor --BS_MC_OFF--.

Column 19, line 31, delete "BSDISPOSABLE" and insert therefor --BS_DISPOSABLE--.

Column 19, line 33, delete "BSBUFFER" and insert therefor --BS_BUFFER--.

Column 19, line 34, delete "49" and insert therefor --39--.

Column 20, line 61, delete "BSSTILLPERIOD" and insert therefor --BS_STILL_PERIOD--.

Column 20, line 63, delete "BSSTILL" and insert therefor --BS_STILL--.

Column 20, line 64, delete "BSSTILLNEXT" and insert therefor --BS_STILL_NEXT--.

Column 20, line 65, delete "BSMCOFF" and insert therefor --BS_MC_OFF--.

Column 20, line 66, delete "BSDISPOSABLE" and insert therefor --BS_DISPOSABLE--.

UNITED STATES PATENT AND TRADEMARK OFFICE
CERTIFICATE OF CORRECTION

PATENT NO.  :  5,386,232
DATED       :  January 31, 1995
INVENTOR(S) :  Stuart Golin, Brian Nickerson, Michael Keith
               and Rohan Coelho.

It is certified that error appears in the above-indentified patent and that said Letters Patent is hereby corrected as shown below:

Column 20, line 68, delete "BSBUFFER" and insert therefor --BS_BUFFER--.

Signed and Sealed this

Eleventh Day of July, 1995

Attest:

BRUCE LEHMAN

Attesting Officer    Commissioner of Patents and Trademarks